US012208795B2

(12) United States Patent
Nelson et al.

(10) Patent No.: US 12,208,795 B2
(45) Date of Patent: Jan. 28, 2025

(54) AUTOMATED VIRTUAL LAUNCH TORQUE GENERATION (71) Applicant: PACCAR Inc, Bellevue, WA (US)

(72) Inventors: James Nelson, Bellingham, WA (US);
Vedran Curgus, Bellingham, WA (US);
Andy Syltebo, Bellingham, WA (US);
Amine Nhila, Arlington, WA (US)

(73) Assignee: PACCAR Inc., Bellevue, WA (US)

( * ) Notice: Subject to any disclaimer, the term of this patent is extended or adjusted under 35 U.S.C. 154(b) by 433 days.

(21) Appl. No.: 17/357,677

(22) Filed: Jun. 24, 2021

(65) Prior Publication Data
US 2022/0410888 A1    Dec. 29, 2022

(51) Int. Cl.
B60W 30/14    (2006.01)
B60W 10/06    (2006.01)
(Continued)

(52) U.S. Cl.
CPC .......... B60W 30/143 (2013.01); B60W 50/00 (2013.01); G06N 20/00 (2019.01);
(Continued)

(58) Field of Classification Search
None
See application file for complete search history.

(56) References Cited

U.S. PATENT DOCUMENTS 38,158 A * 4/1863 Whitney ................. F16H 37/16
                                                 74/23
176,827 A * 5/1876 Otanez ...................... A63C 17/02
                                                 280/11.32
(Continued)

FOREIGN PATENT DOCUMENTS

CN    112392945 A * 2/2021 ............ F16D 48/06
CN    113071496    7/2021
(Continued)

OTHER PUBLICATIONS

European Search Report in Application 22181002.1, mailed Nov. 30, 2022, 9 pages.
(Continued)

Primary Examiner — Jaime Figueroa
Assistant Examiner — Atticus A Cameron
(74) Attorney, Agent, or Firm — Merchant & Gould, P.C.

(57) ABSTRACT

Automated launch torque is provided. An automated virtual launch torque generation (AVL-TG) system may be included in a vehicle, such as a heavy duty truck, that may interoperate with an adaptive cruise control (CC) system to move the vehicle from a standstill or low speed to a CC handover speed. The AVL-TG system may determine a tip-in torque curve configured to mimic a torque curve generated by a human operator's acceleration pedal tip-in from a standstill or low speed. The tip-in torque curve may be represented by torque demand values corresponding to a dynamic pedal saturation level applied over a dynamic pedal rate. The torque demand values determined by the AVL-TG system may mimic an expected or human vehicle operator generated torque request, and may operate to successfully close the clutch and smoothly launch the vehicle from a standstill or low speed.

20 Claims, 8 Drawing Sheets (51) Int. Cl.
  *B60W 30/17* (2020.01)
  *B60W 30/18* (2012.01)
  *B60W 50/00* (2006.01)
  *G06N 20/00* (2019.01)

(52) U.S. Cl.
  CPC ............ *B60W 2050/0026* (2013.01); *B60W 2300/145* (2013.01); *B60W 2510/0638* (2013.01); *B60W 2510/0657* (2013.01); *B60W 2520/10* (2013.01); *B60W 2530/10* (2013.01); *B60W 2540/106* (2013.01); *B60W 2552/15* (2020.02); *B60W 2720/106* (2013.01)

(56) References Cited

U.S. PATENT DOCUMENTS

| | | | |
|---|---|---|---|
| 6,128,564 A * | 10/2000 | Graf | F02D 41/023 |
| | | | 477/109 |
| 7,739,019 B2 | 6/2010 | Robert et al. | |
| 8,060,275 B2 | 11/2011 | Asgari et al. | |
| 11,092,220 B1 * | 8/2021 | Mancini | F16H 37/0826 |
| 2002/0183163 A1 | 12/2002 | Etchason et al. | |
| 2010/0038158 A1 * | 2/2010 | Whitney | B60K 6/485 |
| | | | 180/65.265 |
| 2010/0075803 A1 | 3/2010 | Sharples et al. | |
| 2010/0286887 A1 | 11/2010 | Marayama | |
| 2014/0306638 A1 | 10/2014 | Wu et al. | |
| 2015/0088368 A1 | 3/2015 | Varady et al. | |
| 2018/0042174 A1 | 2/2018 | Li et al. | |
| 2018/0247094 A1 | 8/2018 | Khojastepour et al. | |
| 2020/0055363 A1 | 2/2020 | Paiva et al. | |
| 2022/0176827 A1 * | 6/2022 | Otanez | B60K 1/00 |
| 2023/0086575 A1 | 3/2023 | Swart | |

FOREIGN PATENT DOCUMENTS

| | | | | |
|---|---|---|---|---|
| DE | 100 11 706 | | 9/2001 | |
| DE | 102005036217 | | 2/2007 | |
| DE | 102010001045 | | 7/2011 | |
| EP | 2 685 069 | | 1/2014 | |
| EP | 3 560 783 | | 10/2019 | |
| FR | 3100194 A1 | * | 3/2021 | ............ B60W 10/02 |
| GB | 2 445 836 | | 7/2008 | |
| JP | 2008-161022 | | 7/2008 | |
| JP | 2021037798 A | * | 3/2021 | |
| KR | 20200050737 | * | 5/2020 | |
| WO | 2017151996 | | 9/2017 | |

OTHER PUBLICATIONS

European Extended Search Report in Application 22197561.8, mailed Feb. 7, 2023, 8 pages.

* cited by examiner

AUTOMATED VIRTUAL LAUNCH TORQUE GENERATION

BACKGROUND

Adaptive cruise control (ACC) systems are increasingly being implemented into vehicles as vehicles begin to trend toward automation. For example, an ACC system may operate to maintain a selected speed of the vehicle and to automatically adjust the speed of the vehicle to maintain a safe distance from a preceding vehicle. Currently, ACC systems included in some types of vehicles, such as heavy-duty vehicles, may only operate to modulate the vehicle speed while the vehicle is in motion. For example, some heavy-duty vehicles may include automated manual transmissions that may require closing a clutch to launch based on a set of input criteria. Current ACC systems on some vehicles may not be operative to relaunch the vehicle automatically and smoothly to follow lead traffic, such as in a heavy traffic situation where the vehicle may come to a full stop.

It is with respect to these and other general considerations that embodiments have been described. While relatively specific problems have been discussed, it should be understood that the embodiments should not be limited to solving the specific problems identified in the background.

SUMMARY

The disclosure generally relates to systems, methods, and computer readable storage media for providing automated launch torque generation. For example, aspects of the present disclosure include an automated virtual launch (AVL-TG) system that may operate to automatically generate launch torque for moving a vehicle during a stationary or low speed launch situation where torque is required.

In one aspect, a method for providing automated launch torque is provided. In an example embodiment, the method comprises: receiving an indication to generate a launch torque request to move a vehicle operating in adaptive cruise control mode to a cruise control handover speed; receiving a first signal indicating the vehicle's weight and a second signal indicating the vehicle's grade; determining a pedal saturation value based on the vehicle's weight and the vehicle's grade; receiving a third signal indicating an engine speed; determining a pedal ramp rate for a dynamic application of the pedal saturation value based at least in part on the engine speed; determining launch torque demand based on the pedal saturation value and the pedal ramp rate; and transmitting to one or more powertrain components one or more communications regarding the launch torque demand according to the pedal ramp rate to cause the vehicle to be launched to the cruise control handover speed.

In another aspect, a system is provided that is configured to provide automated launch torque. In an example embodiment, the system comprises at least one processor; a memory storage device, operatively connected to the at least one processor and including instructions that, when executed by the at least one processor, are configured to: receive an indication to generate a launch torque request to move a vehicle operating in adaptive cruise control mode to a minimum threshold speed; receive a first signal indicating the vehicle's weight and a second signal indicating the vehicle's grade; determine a pedal saturation value based on the vehicle's weight and the vehicle's grade; receive a third signal indicating an engine speed; determine a pedal ramp rate for a dynamic application of the pedal saturation value based at least in part on the engine speed; determine launch torque demand based on the pedal saturation value and the pedal ramp rate; and transmit to one or more powertrain components one or more communications regarding the launch torque demand according to the pedal ramp rate to cause the vehicle to be launched to the minimum threshold speed.

In another aspect, a vehicle is provided that is configured to provide automated launch torque. In an example embodiment, the vehicle comprises a powertrain, at least one axle, operatively connected to the powertrain, at least two wheels, operatively connected to the at least one axle, and a computing system, operatively connected to the powertrain and comprising at least one processor and memory containing instructions that, when executed by the at least one processor, cause the at least one processor to: receive an indication to generate a launch torque request to move a vehicle operating in adaptive cruise control mode to a cruise control handover speed; receive a first signal indicating the vehicle's weight and a second signal indicating the vehicle's grade; determine a pedal saturation value based on the vehicle's weight and the vehicle's grade; receive a third signal indicating an engine speed; determine a pedal ramp rate for a dynamic application of the pedal saturation value based at least in part on the engine speed; determine launch torque demand based on the pedal saturation value and the pedal ramp rate; and transmit to one or more powertrain components one or more communications regarding the launch torque demand according to the pedal ramp rate to cause the vehicle to be launched to the cruise control handover speed.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

Aspects of the present disclosure are generally directed to systems, methods, and vehicles for providing automated launch torque generation. An automated virtual launch (AVL-TG) system may operate to automatically generate launch torque for moving a vehicle, e.g., during a stationary or low speed launch situation where torque is required.

The detailed description set forth below in connection with the appended drawings is an illustrative and non-limiting description of various embodiments of the disclosed subject matter. Wherever possible, the same reference numbers are used in the drawings and the following description to refer to the same or similar elements. In the following description, numerous specific details are set forth in order to provide a thorough understanding of illustrative embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein. The illustrative examples provided herein are not intended to be exhaustive or to limit the claimed subject matter to the precise forms disclosed.

While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

The following description proceeds with reference to examples of systems and methods suitable for use in vehicles, such as Class 8 trucks. Although illustrative embodiments of the present disclosure will be described hereinafter with reference to vehicles, it will be appreciated that aspects of the present disclosure have wide application, and therefore, may be suitable for use with many types of vehicles, such as trucks, passenger vehicles, buses, commercial vehicles, light and medium duty vehicles, etc.

Figure 1:
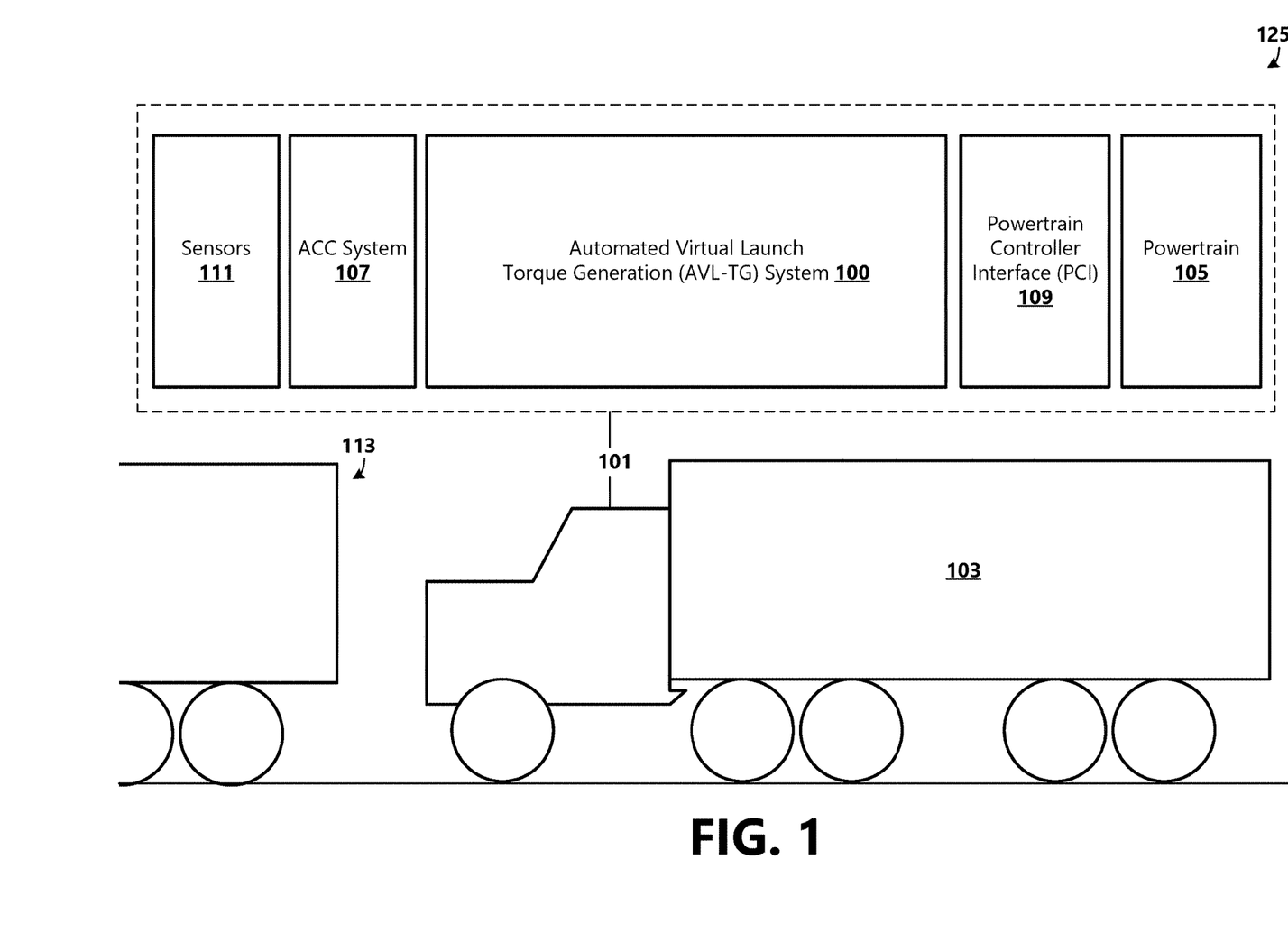
FIG. 1 is an illustration depicting a side view of a vehicle comprising an automated virtual launch torque generation (AVL-TG) system.

With reference now to FIG. 1, an example vehicle 101 is illustrated within which aspects of the present disclosure can be implemented. For example, FIG. 1 includes a side view of the vehicle 101 further including a schematic view of various components that may be included in the vehicle 101 that may operate as part of implementing automated virtual launch torque generation. In some examples, the vehicle 101 may be a heavy-duty truck such as a part of a tractor-trailer combination, which may include the vehicle 101 having, what is sometimes referred to as, a fifth wheel by which a box-like, flat-bed, or tanker semi-trailer 103 (among other examples) may be attached for transporting cargo or the like. While the vehicle 101 is depicted as a truck in FIG. 1, it should be appreciated that the present technology is applicable to any type of vehicle where automated virtual launch torque generation is desired.

As shown, the example vehicle 101 includes a powertrain 105 (shown schematically). The powertrain 105 may operate to generate power and to convert the power into movement. For example, the powertrain 105 may include a power source, such as an engine, and various components that operate to convert the engine's power into movement of the vehicle (e.g. the transmission, driveshafts, differential, and axles). The powertrain 105 may be one of various types of powertrains (e.g., diesel, hydrogen fuel cell, battery electric). In some examples, the vehicle's transmission may be configured to close a clutch based on a set of received input criteria. In an example implementation and as will be described in further detail below, the input criteria may include a torque demand signal generated by an automated virtual launch torque generation (AVL-TG) system 100 included in the vehicle 101.

The vehicle 101 may include a cruise control (CC) system. In some examples, the CC system is configured as an adaptive cruise control (ACC) system 107 that may operate to perform normal CC operations (e.g., maintain a selected (target cruise) speed of the vehicle 101) and may further operate to automatically adjust the speed of the vehicle 101 to maintain a safe distance from a preceding vehicle 113. For example, without human intervention, the ACC system 107 may use various sensors 111 (e.g., radar sensors, laser sensors, cameras) to detect whether the vehicle 101 is approaching another vehicle ahead (e.g., preceding vehicle 113), to determine to automatically slow down the vehicle 101 from the target cruise speed to a lower speed or to a standstill to maintain a safe following distance, and to determine to automatically speed the vehicle 101 back up to the target cruise speed when traffic conditions allow.

According to an aspect, the vehicle 101 may include an AVL-TG system 100 that may interoperate with the ACC system 107 to generate torque requests that may be communicated to an interface for the powertrain 105 (herein referred to as a powertrain controller interface 109) for modulating the vehicle's speed during CC operation. As will be described in further detail below, in various examples, the AVL-TG system 100 may be operative or configured to generate launch torque requests for moving the vehicle 101 from a standstill or from a low speed where torque is required. The AVL-TG system 100 may be further configured to interoperate with other various existing systems installed on the vehicle 101 (e.g., antilock braking system (ABS), automated manual transmissions (AMTs), etc.,) such that the vehicle 101 can slow down and relaunch without driver input based on the actions of the preceding vehicle 113. Example operations of the AVL-TG system 100 are described in further detail below with reference to FIGS. 2-6.

Figure 2:
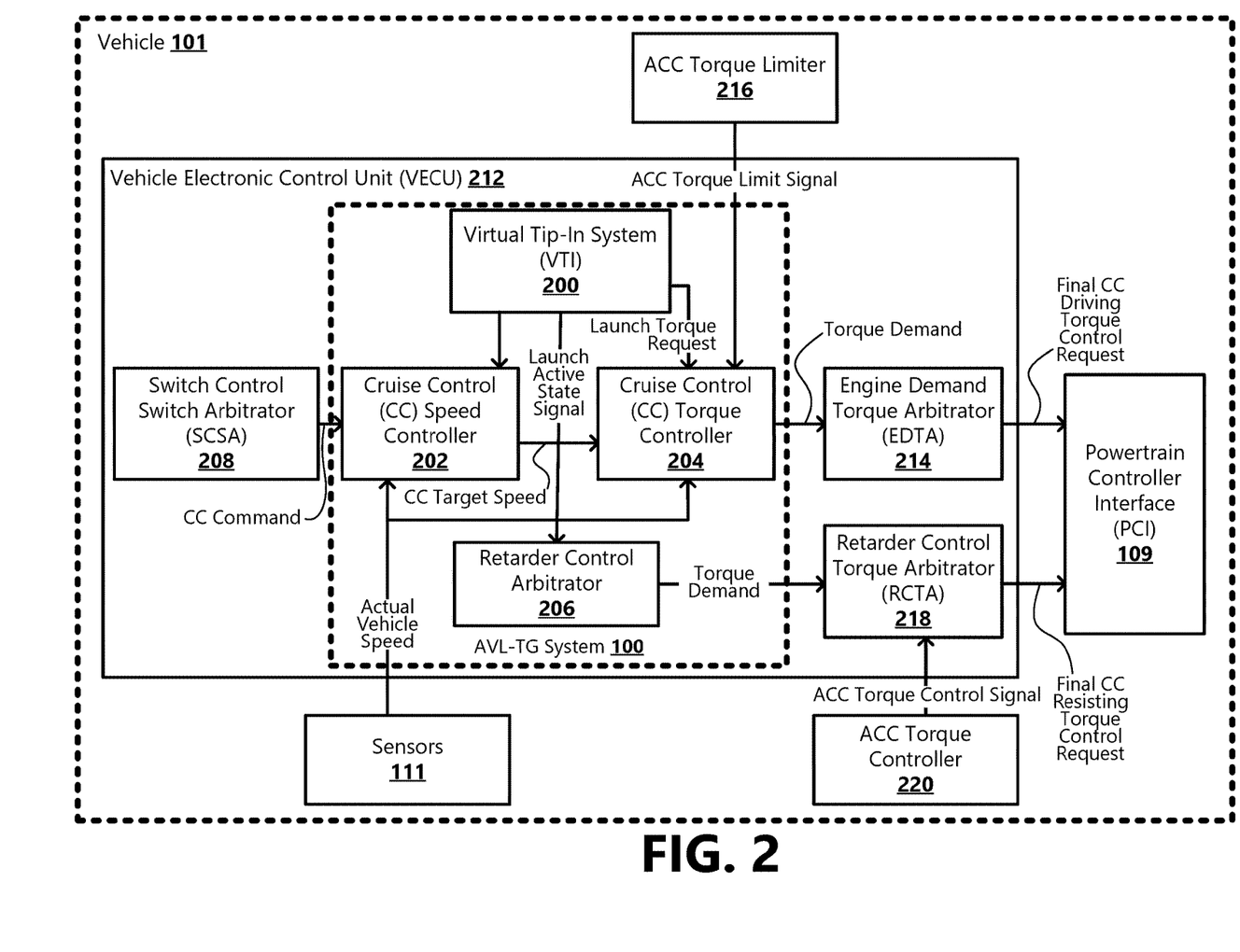
FIG. 2 is a block diagram of an example environment in which an AVL-TG system including a virtual tip-in system can be implemented according to an embodiment.

With reference now to FIG. 2, an example operating environment is illustrated within which an example AVL-TG system 100 may operate. As shown, in some examples, the AVL-TG system 100 may operate in a vehicle electronic control unit (VECU) 212 of the vehicle 101. For example, a VECU 212 including the AVL-TG system 100 may be operative or configured to house various CC related components that operate to automate the vehicle's torque (e.g., driving torque and retarding/braking torque) that may be generated by the vehicle's powertrain 105. As used herein, the term "CC driving torque" may describe driving torque that may be requested by the ACC system 107 to automatically maintain or increase the speed of the vehicle 101 during CC and ACC operation, and the term "CC retarding torque" may describe torque that may be generated by an engine retarder or engine brake that may be requested by the ACC system 107 to automatically slow the vehicle 101 down during ACC operation. In some examples, the VECU 212 may be configured to generate requests (e.g., CC driving torque control requests and CC retarding torque control requests) that may be used to control the vehicle's powertrain 105 for automatically accelerating the vehicle 101 and slowing the vehicle 101. As illustrated, the VECU 212 may be communicatively connected to the PCI 109 via an engine demand torque arbitrator (EDTA) 214 and a retarder control torque arbitrator (RCTA) 218 that may be included in the VECU 212. For example, powertrain-related requests, such as CC driving torque control requests and CC retarding torque control requests, may be communicated to the PCI 109 for controlling the powertrain 105.

As mentioned above with respect to FIG. 1, the PCI 109 may operate as an interface for the powertrain 105. For example, the PCI 109 may be operative or configured to receive powertrain-related requests from the VECU 212, such as CC torque control requests and retarder torque control requests, and turn those requests into powertrain actions. The powertrain 105 may be one of a various types of powertrains, and the PCI 109 may operate as an intermediate layer between the VECU 212 (including the AVL-TG system 100) and the various types of powertrains. In some examples, a powertrain action may result in vehicle 101 motion (e.g., acceleration during normal CC and ACC operation to maintain a target cruise speed, launching from a stop or a low speed during a launch-on operation, or engine braking to slow the vehicle during normal ACC operation).

As shown, the AVL-TG system 100 may comprise a virtual tip-in VTI system, herein referred to as a VTI 200, that may interoperate with the ACC system 107. For example, the VTI 200 may be configured to interoperate with ACC torque generation architecture components (e.g., a cruise control speed controller (CC speed controller) 202, a cruise control torque controller (CC torque controller) 204, and a retarder control arbitrator 206). According to an aspect, during ACC operation, the VTI 200 may be configured to generate launch torque requests for moving the vehicle 101 from a standstill or from a low speed where torque is required. The launch torque requests may override normal CC torque demand that may be normally be determined by the CC torque controller 204, such as to maintain a set CC cruise speed during regular CC operation. In some examples, the VTI 200 may track various ACC conditions and states to determine whether conditions are satisfied to generate CC launch torque and to determine a tip-in torque curve for providing launch torque comprising a dynamic pedal saturation level and ramp rate that may be configured to mimic the torque curve generated by a vehicle operator's pedal tip-in from a standstill or low speed.

In some examples, the tip-in torque curve determined by the VTI 200 may include a dynamic saturation value and a dynamic pedal saturation rate based on the vehicle weight and a current grade of the vehicle 101. For example, a higher vehicle weight and/or grade may correspond with a quicker torque application. In some examples, the VTI 200 may be configured to generate launch torque requests when the actual speed of the vehicle 101 is below a minimum threshold level. In some examples, the minimum threshold level corresponds with a lower bound of a CC governor, and may sometimes be referred to herein as a CC handover speed, where torque demand control may be handed off between the VTI 200 and the CC torque controller 204. For example, when the vehicle's actual speed reaches or exceeds the minimum threshold level, regular ACC torque operation may resume (e.g., the VTI 200 may discontinue generating and sending launch torque requests to the CC torque controller 204). Aspects associated with determining to generate a launch torque request and determining the tip-in torque curve for the launch torque demand are described in further detail below with reference to FIGS. 3-7.

As described above, the VTI 200 may interoperate with various ACC torque generation architecture components. For example, the CC speed controller 202 may operate to receive CC command information from a switch control switch arbitrator (SCSA) 208, which may include CC on/off information, a target cruise speed setting, following distance level selection information, other CC switch information, retarder switch input, brake pedal input, and the like. The CC speed controller 202 may further operate to receive actual vehicle speed information from a sensor 111 included in the vehicle 101, such as a vehicle speed sensor that may operate to transmit vehicle speed information to the VECU 212. The CC speed controller 202 may further operate to determine a CC target cruise speed for regular CC operation based on the received information. The CC speed controller 202 may further operate to provide CC state information to other components. For example, the CC speed controller 202 may communicate the CC target cruise speed to the CC torque controller 204. In some implementations, the CC target speed may be utilized as an input by the CC torque controller 204 for determining CC driving torque demand for the powertrain 105. In some examples, the VTI 200 may be configured to communicate with the CC speed controller 202. For example, when the VTI 200 determines that the vehicle speed has reached the CC handover speed, the VTI 200 may be configured to output a signal to the CC speed controller 202 that may operate as a virtual CC resume signal to hand over CC torque demand control to the CC torque controller 204.

The CC torque controller 204 is illustrative of a software module, system, or device that may be operative or configured to determine a driving torque demand for CC operation. For example, the CC torque controller 204 may operate to determine CC torque demand that may be requested for moving the vehicle 101 during normal CC operation. In some examples, the CC torque controller 204 may be configured to receive ACC torque limit signals. For example, various sensors 111 that the ACC system 107 may utilize may sense a preceding vehicle 113, and an ACC torque limiter 216 included in the ACC system 107 may provide a signal to the CC torque controller 204 associated with a torque limit to prevent the vehicle 101 from encroaching a predetermined safe following distance from the preceding vehicle 113. In some examples, the torque limit signal may be used by the CC torque controller 204 to limit a CC driving torque demand and/or a launch torque demand determined by the VTI 200.

In some examples, various conditions may be checked by the VTI 200, and when satisfied, may trigger the VTI 200 to transition into a launch-on or launch-active state, where the VTI 200 may determine a launch torque demand and generate a launch torque request that may be sent to the CC torque controller 204. As will be described in further detail below, the launch torque demand may be based on a tip-in torque curve with a dynamic pedal saturation level and dynamic pedal ramp rate. The CC torque controller 204 may be configured to receive the launch torque request from the VTI 200. In some implementations, the CC torque controller 204 may be configured to bypass determining CC torque demand when the VTI 200 is in a launch-on/active state and to include the received launch torque request in a CC driving torque demand request that may be communicated to the EDTA 214.

In some examples, the EDTA 214 may be operative or configured to receive driving torque demand requests from the CC torque controller 204 and arbitrate the received requests for generating a final CC driving torque control request that may be communicated to the PCI 109 for performing an associated powertrain action. In some examples, the final CC driving torque control request may include a dynamic launch torque demand generated by the VTI 200.

In some examples, the transmission included in the powertrain 105 may be configured to receive a vehicle operator's torque demand to initiate a clutch closure for a launch. Accordingly, the AVL-TG system 100 may operate to generate and output a virtual vehicle operator launch torque demand that may mimic an actual vehicle operator torque demand. Accordingly, the transmission may receive a torque control request that includes the virtual vehicle operator launch torque demand generated by the AVL-TG system 100, and may respond to the request, and properly close the clutch, as if the request were being generated by an actual vehicle operator.

With reference still to FIG. 2, in some examples, the VTI 200 may be in communication with the retarder control arbitrator 206. For example, the VTI 200 may be configured to communicate a signal to the retarder control arbitrator 206 when the VTI 200 is in a launch-on or launch-active state. This signal may be referred to herein as a launch-active state signal. The launch-active state signal may operate to prevent the powertrain 105 from performing engine retarding functions during the launch-active state. For example, when in the launch-active state, the VTI 200 may communicate a launch torque request to the CC torque controller 204 to move the vehicle 101 from a standstill or low speed, and may further communicate a launch-active state signal to the retarder control arbitrator 206.

In some examples, the retarder control arbitrator 206 may be communicatively connected to the RCTA 218. For example, the retarder control arbitrator 206 may operate as an engine retarder controller configured to determine CC retarding torque demand. In some examples, the RCTA 218 may be configured to arbitrate received CC retarding torque demand requests and signals (e.g., ACC torque control signals) for generating a final CC retarding torque control request that may be communicated to the PCI 109 for performing an associated engine braking-related powertrain action. For example, the RCTA 218 may receive an ACC torque control signal from an ACC torque controller 220. According to one example, the ACC torque control signal be a signal to turn the engine retarder on or a signal to turn the engine retarder oft which may be arbitrated with other ACC retarding torque requests and signals received by the RCTA 218 for generating final CC retarding torque control requests that are sent to the PCI 109.

Figure 3:
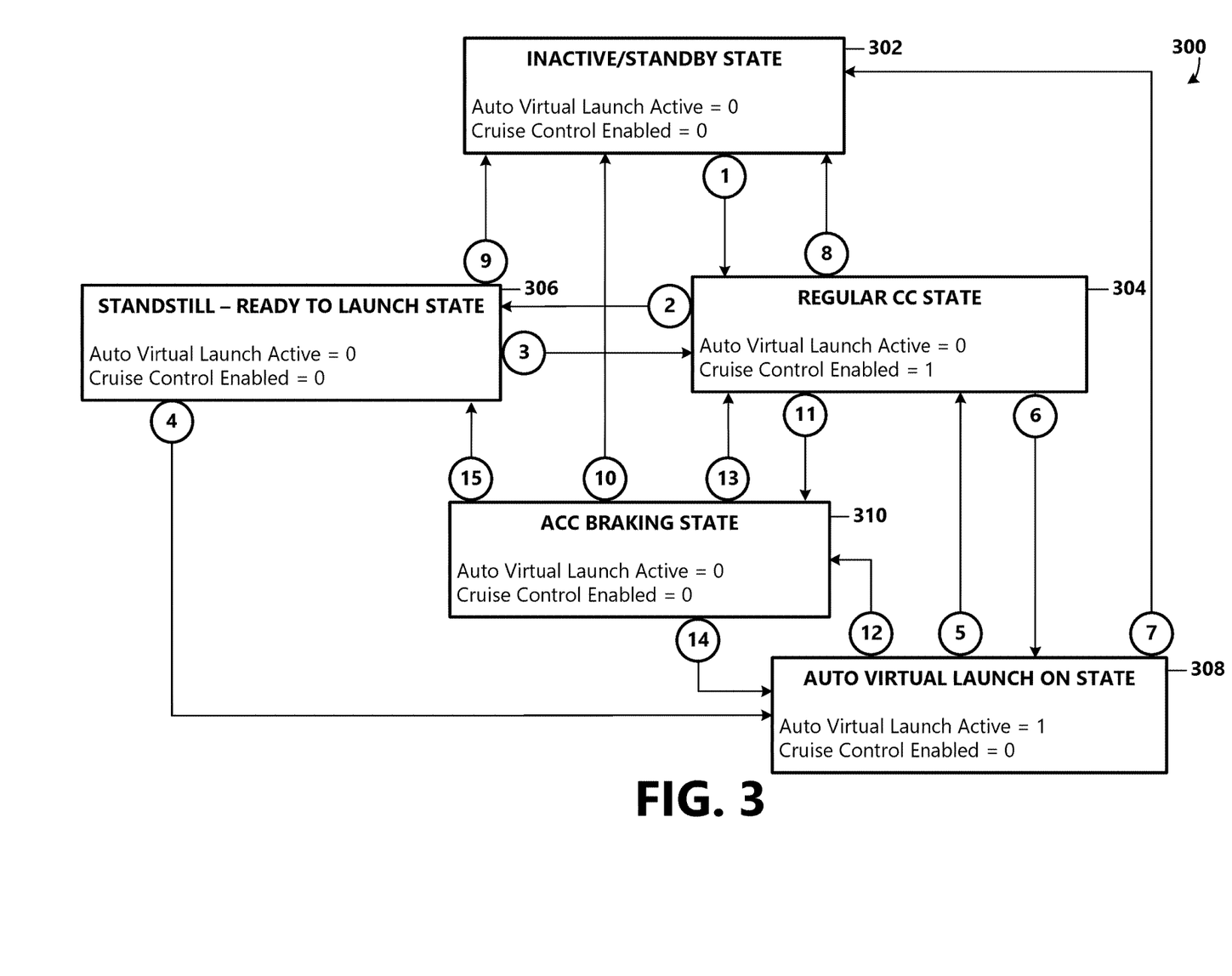
FIG. 3 is a state diagram illustrating an example general logic flow according to an embodiment.

With reference now to FIG. 3, an illustration of an example state machine diagram 300 is provided showing an example general logic flow that may be implemented by the VTI 200 according to an embodiment. For example, the VTI 200 may include a state machine for determining when to transition into various states, including a launch-active state where virtual operator launch torque demand may be determined and a launch torque request may be generated for generating launch torque to move the vehicle 101 from a standstill or low speed. In each state 302, 304, 306, 308, 310 of the state machine, the VTI 200 may be configured to evaluate certain inputs, wherein when those inputs satisfy certain conditions, the VTI 200 may operate to transition into the associated state. Example inputs that may be evaluated by the VTI 200 include, but are not limited to: a calibration to determine whether the VTI 200 exists on the vehicle 101 and/or whether the VTI switch is enabled, engine speed, vehicle weight, engine reference torque, CC state, driver's pedal position, vehicle speed, nominal friction and estimated parasitic torque losses, ACC resume command, ACC pause command, ACC disable command, ACC control mode, transmission current gear, transmission requested gear, brake pedal switch status, and vehicle current grade value. For example, the various inputs may be received from various sensors 111 included in the vehicle 101.

As shown, in some examples, the VTI 200 may initially operate in an inactive/standby state 302, where the CC function may not be enabled or engaged.

In another example and as indicated by circled numeral 4, a fourth set of conditions may be satisfied that may cause the VTI 200 to transition from the standstill/ready-to-launch state 306 to the launch-on/active state 308. As described above, in the launch-on/active state 308, the VTI 200 may generate a launch torque request to move the vehicle 101 from a standstill or low speed. In one example, the low speed includes any speed below one of ten miles per hour, below five miles per hour, below two miles per hour, or below one mile per hour. In one example implementation, the VTI 200 may be configured to determine to transition from the standstill/ready-to-launch state 306 to the launch-on/active state 308 based on signals indicating: the forward drive gear is active and a cruise resume command is received. For example, when traffic conditions allow, the vehicle 101 may automatically resume acceleration up to the target cruise speed from a standstill.

In some examples, when the VTI 200 is in the launch-on/active state 308, various sets of inputs may be evaluated for determining whether to transition to another state. For example, and as indicated by circled numeral 5, a fifth set of conditions may be satisfied that may cause the VTI 200 to transition from the launch-on/active state 308 back to the regular CC state 304. In one example implementation, the VTI 200 may be configured to determine to transition from the launch-on/active state 308 back to the regular CC state 304 based on signals indicating: the vehicle speed is at or above the CC handover speed (i.e., the minimum threshold value) and no cruise control related errors are detected. For example, an indication that the vehicle 101 has reached the CC handover speed may operate at least in part to signal to the VTI 200 to hand control back over to the CC torque controller 204 for CC torque demand. In some examples, the VTI 200 may be configured to provide a seamless handover to the CC torque controller 204. For example, the VTI 200 may operate to provide a signal to the CC speed controller 202, which may operate as a virtual CC resume signal. Further the VTI 200 may continue to generate launch torque requests for a predetermined number of cycles (e.g., n cycles) beyond when VTI launch-on state is active to reduce or eliminate a gap in the CC torque demand being requested by the AVL-TG system 100 (e.g., between the VTI 200 stopping and the CC torque controller 204 starting back up for normal CC operation).

In some examples, and as indicated by circled numeral 6, a sixth set of conditions may cause the VTI 200 to transition from the regular CC state 304 to the launch-on/active state 308, where launch torque demand may be generated by the VTI 200. According to one example, the sixth set of conditions may include a signal indicating the vehicle speed is less than the CC handover speed. For example, the ACC system 107 may be operating to slow the vehicle 101 to a low speed without the engine retarder, and when the vehicle speed falls below the CC handover speed, the VTI 200 may transition to the launch-on/active state 308.

In some examples, the vehicle operator may activate the brakes (e.g., depress a brake pedal), which may cause the ACC system 107 to be disabled. Accordingly, as indicated by circled numerals 7, 8, 9, and 10 a signal indicating an application of vehicle operator brakes may cause the VTI 200 to exit out of the regular CC state 304, standstill/ready-to-launch state 306, launch-on/active state 308, or ACC braking state 310 to the inactive/standby state 302.

In some examples, the VTI 200 may transition to the ACC braking state 310 when the engine braking system (also referred to herein as an engine retarder) is activated by the ACC system 107. As indicated by circled numerals 11 and 12, a signal indicating the ACC-initiated engine brake request may cause the VTI 200 to transition from the regular CC state 304 or the launch-on/active state 308 to the ACC braking state 310. For example, in the ACC braking state 310, a CC retarding torque control request may be generated and communicated to the PCI 109.

In some examples, the VTI 200 may operate to evaluate various sets of inputs for determining whether to transition from the ACC braking state 310 to another state. In one example and as indicated by circled numeral 13, the VTI 200 may transition from the ACC braking state 310 to the regular CC state 304 if, at the end of braking, the vehicle speed is at or above the CC handover speed. In another example and as indicated by circled numeral 14, the VTI 200 may transition from the ACC braking state 310 to the launch-on/active state 308 if, at the end of braking, the vehicle speed is below the CC handover speed. In another example and as indicated by circled numeral 15, the VTI 200 may transition from the ACC braking state 310 to the standstill/ready-to-launch state 306 if, at the end of braking, the vehicle is at a standstill. As can be appreciated, in other example implementations, the VTI 200 may operate to evaluate additional or alternative inputs. Further, additional or alternative conditions may be satisfied to cause the VTI 200 to transition from one state to another state. Moreover, in some examples, the conditions and values associated with the conditions may be configurable.

Figure 4:
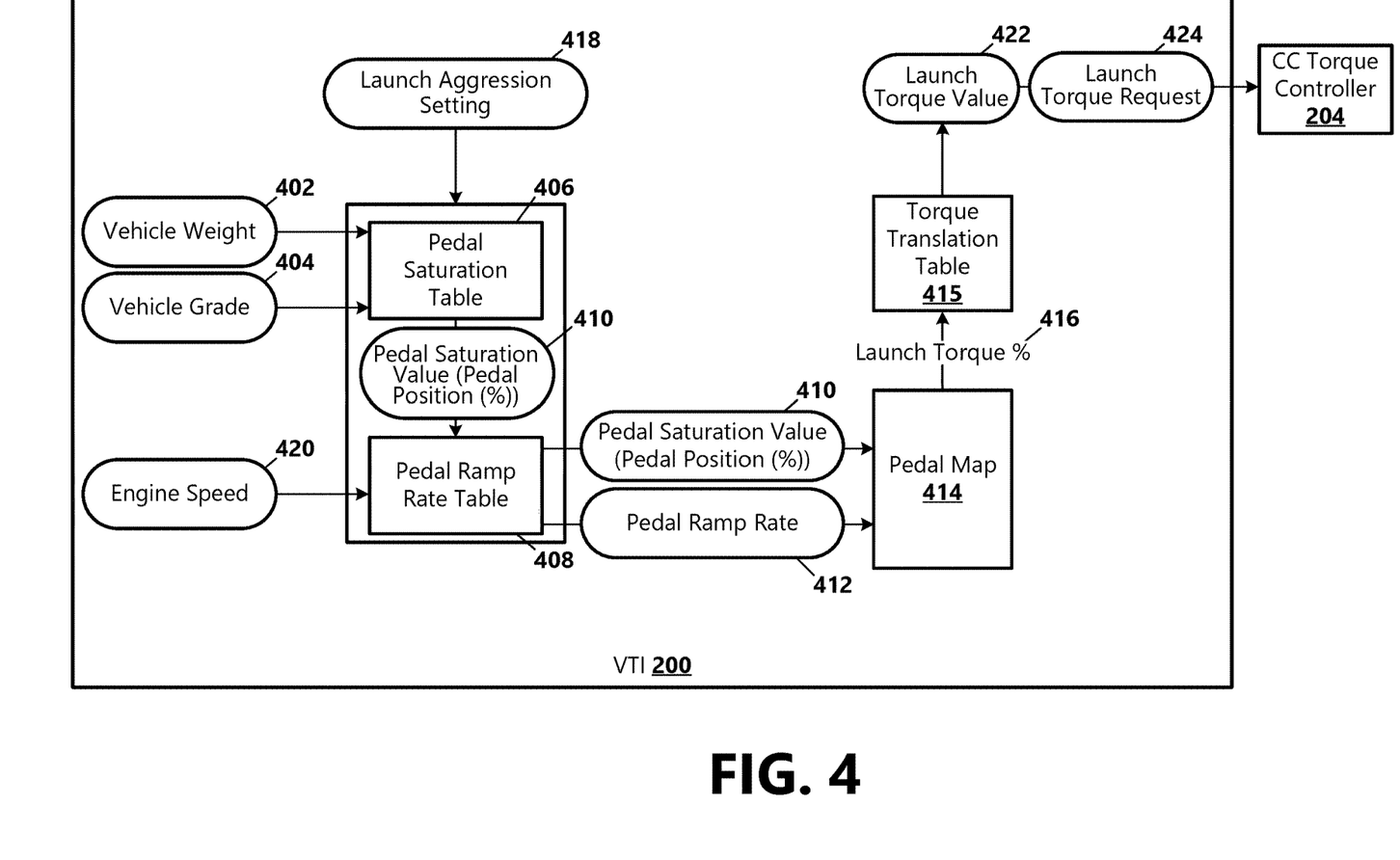
FIG. 4 is a block diagram illustrating example components of a virtual tip-in system.

With reference now to FIG. 4, the VTI 200 is described in further detail. According to an aspect, various inputs may be received by the VTI 200, which may be used to determine the launch torque demand. For example and as shown, a signal indicating the weight of the vehicle 101 (i.e., vehicle weight 402) and a signal indicating the pitch angle or grade of the vehicle 101 (i.e., vehicle grade 404) may be received as inputs by the VTI 200. According to one example, the vehicle weight 402 signal may be received from a sensor 111 included in the vehicle 101, such as a weight sensor that may operate to transmit vehicle load information from, for example, a load bearing axle, to the VECU 212. According to another example, the vehicle grade 404 signal may be received from another sensor 111 included in the vehicle 101, such as an incline sensor or accelerometer that may operate to transmit vehicle grade information to the VECU 212. The vehicle weight 402 and the vehicle grade 404 may be input into a first table, referred to herein as a pedal saturation table 406, to generate a pedal saturation value 410 (e.g., a pedal position percentage) based on the inputs. For example, the pedal saturation value 410 may correspond with a percentage of saturation of the vehicle operator's accelerator pedal to move the vehicle 101 from its current speed and position up to the CC handover speed.

The pedal saturation value 410 may be input into a second table, referred to herein as a pedal ramp rate table 408, to determine a pedal ramp rate 412 to reach the pedal saturation value 410 based on the vehicle weight 402, the vehicle grade 404, and engine speed 420. For example, the engine speed 420 signal may be received from a sensor 111 included in the vehicle 101, such as an engine speed sensor that may operate to transmit engine rotational speed information to the VECU 212. In some examples, the pedal saturation may be dynamically applied up to a determined maximum pedal saturation value based on the pedal ramp rate 412, representing a tip-in torque curve configured to mimic a torque curve generated by a vehicle operator's acceleration pedal tip-in.

The tables (e.g., the saturation table 406 and the ramp rate table 408) may represent the pedal saturation values and ramp rates corresponding to launching the vehicle 101 at various vehicle weight 402 and vehicle grade 404 combinations. For example, the vehicle 101 launching on a steep hill may accelerate differently than it would on a flatter grade. Further, when the vehicle 101 has a heavier load, it may accelerate differently than it would with a lighter load. Further still, various combinations thereof may cause the vehicle 101 to accelerate differently. In some examples, the values included in the saturation table 406 and the ramp rate table 408 may be determined based on a mathematical model. In other examples, the values included in the saturation table 406 and the ramp rate table 408 may be determined based on a machine learning algorithm that may be trained to learn the various pedal saturation values and ramp rates corresponding to launching the vehicle 101 at various vehicle weight 402 and vehicle grade 404 combinations. For example, the machine learning algorithm may be trained to learn a vehicle operator's pedal tip-in behaviors associated with launching the vehicle 101 from a standstill or from a low speed.

In some examples, the launch torque can be adjusted to allow for vehicle operator selection of an aggressiveness of the launch. For example, a selector (e.g., user interface control, user interface display menu option, switch) may be included in the vehicle 101 that the vehicle operator may be enabled to use to select a desired level of launch aggressiveness (referred to in FIG. 4 as a launch aggression setting 418), wherein a less-aggressive launch may describe a smoother launch with a lower pedal ramp rate, and a more-aggressive launch may describe a faster launch with a higher pedal ramp rate. In some examples, different levels of launch aggressiveness may correspond with different multipliers that may be applied to the values included in the ramp rate table 408 to correspondingly adjust the pedal ramp rate and, thus, the tip-in torque curve. As should be appreciated, in a situation where a preceding vehicle 113 is sensed within a predetermined distance in front of the vehicle 101, an ACC torque limit signal may be communicated to the CC torque controller 204, which may limit the requested torque demand to prevent the vehicle 101 from launching into the preceding vehicle 113.

In some examples, the determined pedal saturation value 410 and pedal ramp rate 412 may be input into a pedal map 414. For example, the pedal saturation value 410 may be provided as a pedal position associated with a percentage of saturation of the vehicle operator accelerator pedal. The pedal map 414 may include a dynamic lookup table that, based on the received inputs, may be used to translate the pedal position (i.e., pedal saturation value 410) and pedal ramp rate 412 to a torque demand percent 416. For example, the pedal map may include pedal position translation information comprising relationships between pedal positions and torque demand associated with the vehicle's particular powertrain 105. For example, various types of powertrains 105 may have different pedal map information. Accordingly, the pedal map 414 may have calibratable values that can be adjusted depending on the powertrain 105 operating to create the torque.

In some examples, the launch torque demand may further be translated from a percent into a value (i.e., a launch torque value 422). For example, various systems included in the vehicle 101 may understand torque as an actual value. Accordingly, a torque translation table 415 may be used to translate the torque demand percent 416 into a launch torque value 422 that may be communicated to the CC torque controller 204 in one or more launch torque requests 424 at a rate that the transmission may be configured to expect from being received from the vehicle operator accelerator pedal. According to an aspect, the dynamically saturated and dynamic pedal ramp rate launch torque request(s) 424 may mimic the vehicle operator's throttle application at a standstill or low speed.

Figure 5:
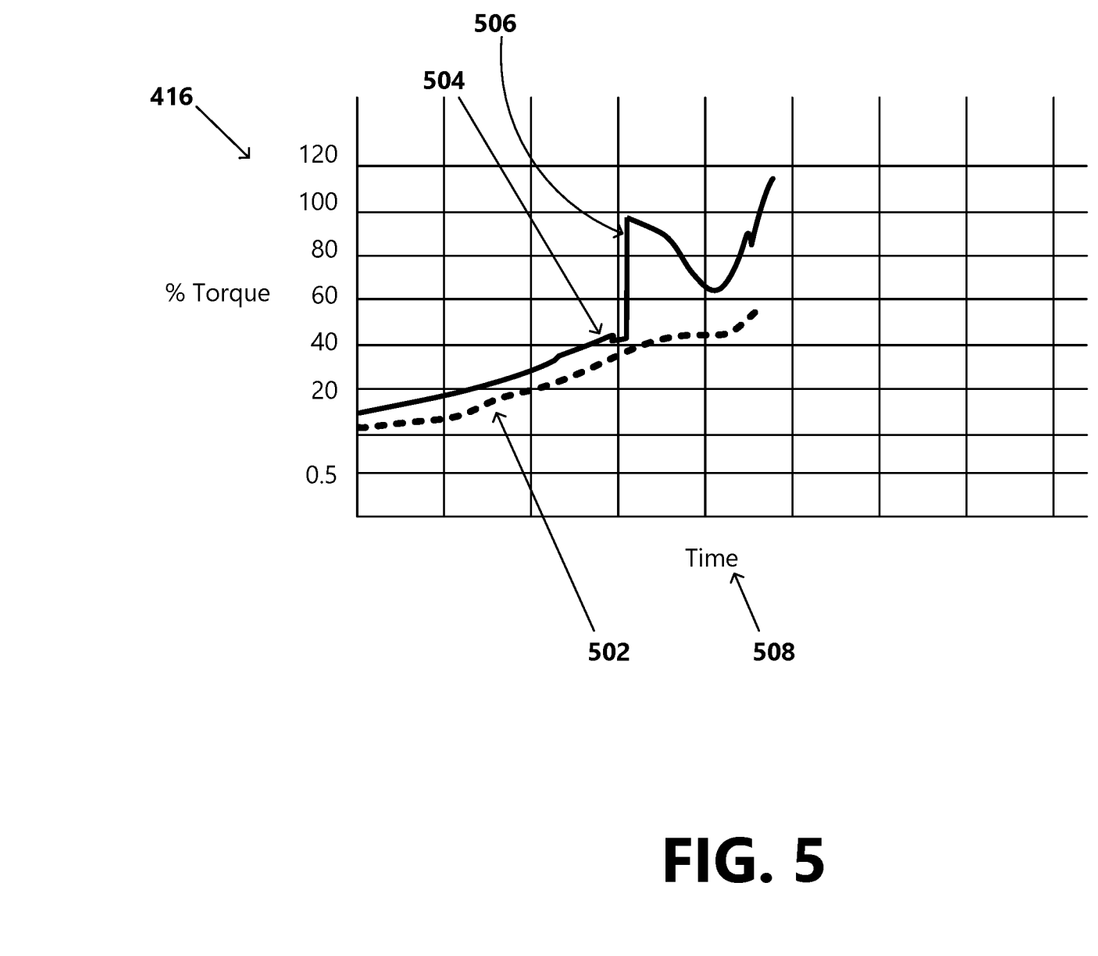
FIG. 5 is an illustration depicting an example graphed launch torque request that may be generated by the AVL-TG system.

With reference now to FIG. 5, an example virtual operator launch torque demand 502 (illustrated as a dotted line) generated by the VTI 200 is shown graphed in comparison with an example regular torque demand 504 that may be generated without utilizing aspects of the present disclosure (illustrated as a solid line). In the illustrated example, the VTI launch torque demand 502 may be determined based on the pedal saturation table 406 and the pedal map 414, wherein the launch torque may be dynamically applied and distributed over time 508 based on the pedal ramp rate table 408 and, if present, a vehicle operator-selected launch aggression setting 418. For example, the illustrated virtual operator launch torque demand 502 is shown in percent format 416 (e.g., rather than in a value format that may be transmitted to the CC torque controller 204). As shown, the virtual operator launch torque demand 502 may change dynamically throughout the launch based on the translation values included in the pedal map 414 and the engine speed 420.

Further as shown, the virtual operator launch torque demand 502 generated by the VTI 200 may be configured to mimic a human vehicle operator's pedal tip-in. For example, the transmission may be configured to close the clutch based on vehicle operator demand torque values received at an appropriate rate, and may successfully operate to close the clutch when the received launch torque demand 502 mimics an expected or human vehicle operator generated torque request. As shown, the regular torque demand 504 may include a square wave action 506 that may represent a large amount of torque that may be applied abruptly, which may create an uncomfortable vehicle response and harsh feeling driver-off performance. In comparison, the virtual operator launch torque demand 502 generated by the VTI 200 may include a dynamic pedal ramp rate 412, which may successfully close the clutch and allow the vehicle 101 to launch smoothly. Accordingly, implementation of the VTI 200 may help satisfy customer expectations of a quality vehicle 101.

Figure 6:
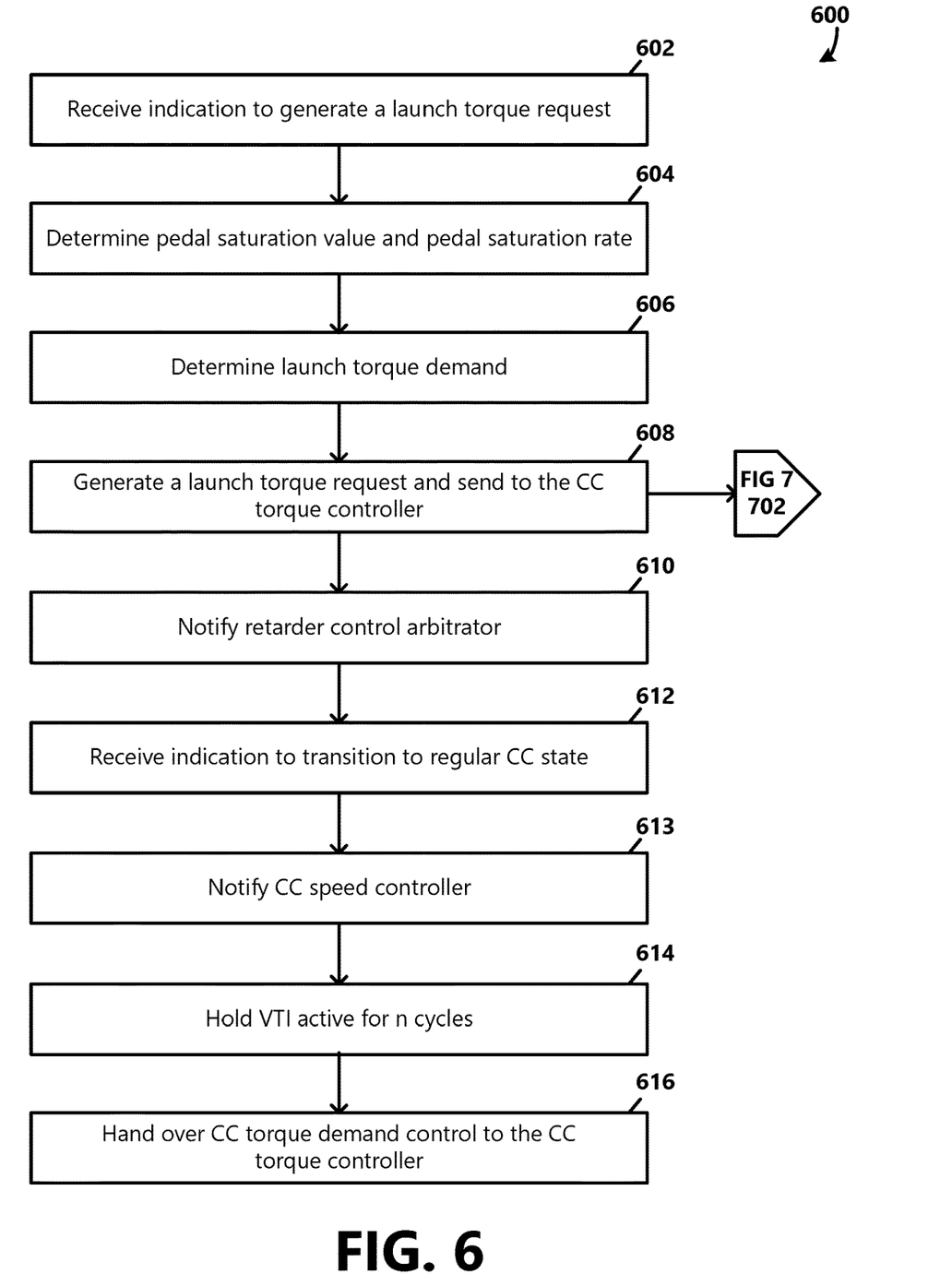
FIG. 6 is a flow diagram depicting general stages of an example process for providing automated launch torque generation.

With reference now to FIG. 6, a flow diagram is shown depicting general stages of an example method 600 for providing automated launch torque generation. For example, the operations included in FIG. 6 may include example operations that may be performed by the VTI 200 when the VTI 200 receives signals that cause the VTI 200 to transition into the launch-on/active state 308 and further into the regular CC state 304. At OPERATION 602, an indication to generate a launch torque request may be received. For example, with reference back to the example state machine diagram 300 illustrated in FIG. 3, and as indicated by circled numerals 4, 6, and 14, various input signals may be evaluated for determining whether a set of conditions are satisfied to transition from a current state to the launch-on/active state 308.

In one example scenario, the ACC system 107 may initially be operating in regular CC mode, wherein sensed traffic conditions may cause the ACC system 107 to slow the vehicle 101 to a standstill or to a low speed to maintain a safe following distance from a preceding vehicle 113. When the ACC system 107 is operating in the regular CC mode, the VTI 200 may be configured to correspondingly operate in the regular CC state 304. In some examples, depending on various vehicle conditions, such as the vehicle speed and whether the engine retarder system is requested to slow down the vehicle 101, the VTI 200 may operate to remain in the regular CC state 304 or to transition from the regular CC state 304 to the standstill/ready-to-launch state 306 or to the ACC braking state 310. When traffic conditions allow, as determined by various sensors 111, a determination may be made that a set of conditions may be satisfied that may cause the VTI 200 to transition from the regular CC state 304, the standstill/ready-to-launch state 306, or the ACC braking state 310 to the launch-on/active state 308, where launch torque may be generated to move the vehicle 101 from a standstill or low speed to the preset CC handover speed.

At OPERATION 604, a pedal saturation value 410 (e.g., pedal position percentage) may be determined. For example, the vehicle weight 402 and the vehicle grade 404 may be used as inputs in the pedal saturation table 406 for determining the pedal saturation value 410. Further, the pedal ramp rate 412 may be determined. For example, the pedal saturation value 410 and engine speed 420 may be input into the pedal ramp rate table 408 for determining the pedal ramp rate 412. In some examples, the pedal ramp rate 412 may be adjusted based on a vehicle operator-selected launch aggression setting 418.

At OPERATION 606, the determined pedal saturation value 410 and pedal ramp rate 412 may be input into the pedal map 414 associated with the vehicle powertrain 105 for determining the launch torque demand. For example, the output of the pedal map 414 may include a torque demand percent 416. The torque demand percent 416 may be input into a torque translation table 415 that may be used to translate the torque demand percent 416 into a launch torque value 422 that may be understood by other vehicle system components, such as by the PCI 109 for controlling the powertrain 105.

At OPERATION 608, one or more launch torque requests 424 may be communicated to the CC torque controller 204 based on the determined launch torque value 422 and pedal ramp rate 412. For example, the one or more launch torque requests 424 may include dynamic launch torque demand values 422 that may be distributed over time based on the pedal ramp rate 412 such that the launch torque request mimics a human vehicle operator's pedal tip-in and may successfully allow the clutch to close. Example operations that may be performed by the CC torque controller 204 in an example method 700 of providing automated launch torque generation is described below with reference to FIG. 7.

At OPERATION 610, a notification of the launch-on/active state 308 of the VTI 200 may be communicated to the retarder control arbitrator 206 to prevent the powertrain 105 from performing engine braking functions during the launch.

At OPERATION 612, an indication to transition from the launch-on/active state 308 to the regular CC state 304 may be received. For example, when a set of conditions may be determined to be satisfied, the VTI 200 may transition from the launch-on/active state 308 to the regular CC state 304. In one example, the set of conditions may include an indication that the vehicle speed has reached the CC handover speed.

At OPERATION 613, a signal that the VTI 200 is transitioning to the regular CC state 304 may be sent to the CC speed controller 202. For example, the signal may be received as a virtual CC resume signal that may indicate that the VTI 200 is discontinuing generating CC launch torque demand requests and that the CC torque controller 204 will be handling the CC torque demand requests.

At OPERATION 614, launch torque requests 424 may continue to be generated by the VTI 200 for n cycles. For example, the VTI 200 may be configured to provide a seamless handover to the CC torque controller 204, and may operate to generate launch torque requests for n cycles beyond when VTI launch-on state is active to reduce or eliminate a gap in the CC torque demand being requested by the AVL-TG system 100.

At OPERATION 616, CC torque demand control may be handed over to the CC torque controller 204. For example, the VTI 200 may discontinue generating launch torque requests to mimic the vehicle driver's pedal tip-in, and CC torque demand output by the CC torque controller 204 may be determined by the CC torque controller 204.

Figure 7:
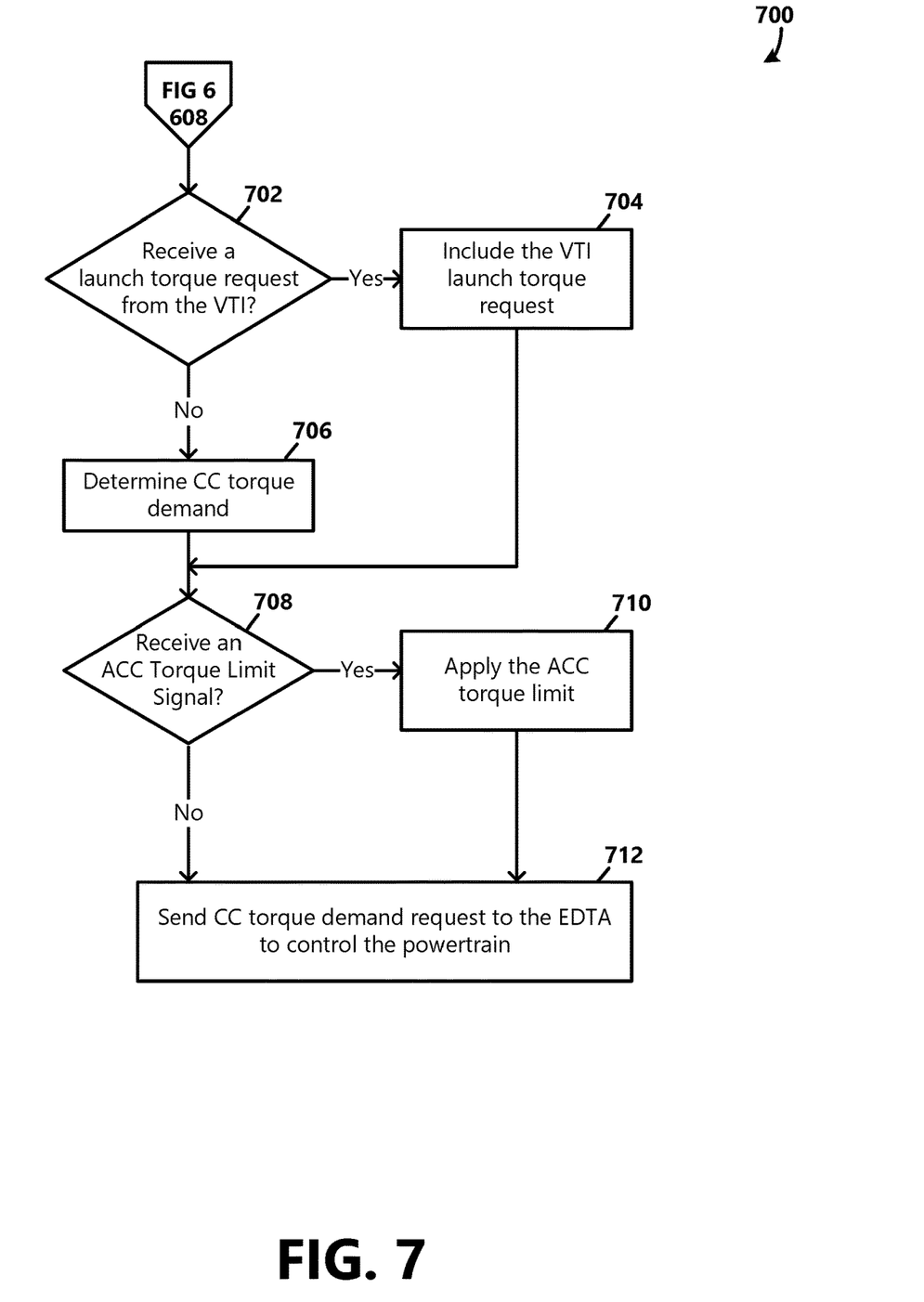
FIG. 7 is another flow diagram depicting general stages of an example process for providing automated launch torque generation.

With reference now to FIG. 7, a flow diagram is shown depicting general stages of an example method 700 for providing automated launch torque generation. For example, the operations included in FIG. 7 may include example operations that may be performed by the CC torque controller 204 as part of generating torque demand requests for CC operation. At DECISION OPERATION 702, a determination may be made as to whether a launch torque request 424 has been received from the VTI 200. For example, the VTI 200 may generate launch torque requests 424 when the vehicle speed is below the CC handover speed. According to one example, the one or more launch torque requests 424 generated at OPERATION 608 in FIG. 6 may be received by the CC torque controller 204. When a VTI launch torque request 424 is received, it may be included (OPERATION 704) in a torque demand request that may be communicated to the EDTA 214.

At OPERATION 706, a CC torque demand value may be determined by the CC torque controller 204 to maintain a target cruise speed. For example, a target cruise speed may be set, which may be communicated to the CC torque controller 204 by the CC speed controller 202 and used to determine the CC torque demand.

At DECISION OPERATION 708, a determination may be made as to whether an ACC torque limit signal may be received from the ACC torque limiter 216. For example, the ACC torque limit signal may be based on the ACC system 107 receiving a signal associated with a distance from a preceding vehicle 113. For example, the ACC torque limit may be used to limit torque demand to prevent the vehicle 101 from encroaching a predetermined safe following distance from the preceding vehicle 113 and possibly colliding into the preceding vehicle 113. When an ACC torque limit signal is received, at OPERATION 710, the ACC torque limit may be applied as a limit to the CC torque demand determined by the CC torque controller 204 or, if received, the launch torque demand request received from the VTI 200.

At OPERATION 712, a CC driving torque demand request may be sent to the EDTA 214. For example, the CC driving torque demand request may include the CC torque demand determined by the CC torque controller 204 or, if received, the launch torque demand determined by the VTI 200. In some examples, received torque demand requests may be arbitrated by the EDTA 214. A final CC driving torque demand request may be generated by the EDTA 214 and communicated to the PCI 109 for performing an associated powertrain action. In some examples, such as when launch torque demand is generated by the VTI 200, the associated powertrain action is a smooth launch from a standstill or a low speed.

Figure 8:
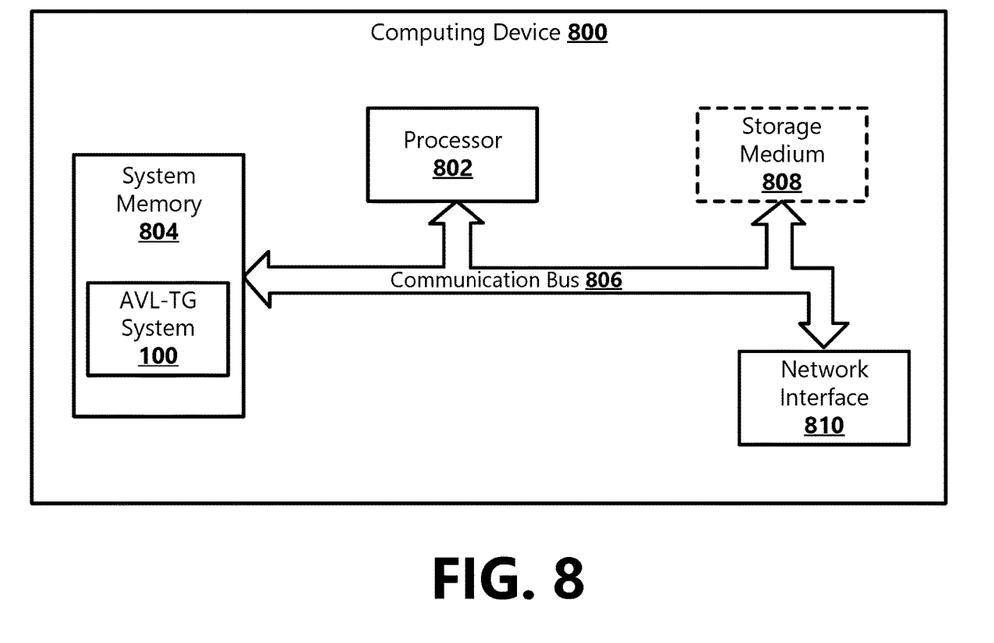
FIG. 8 is a block diagram of example physical components of a computing device or system with which embodiments may be practiced.

FIG. 8 is a block diagram of an illustrative computing device 800 appropriate for use in accordance with embodiments of the present disclosure. The description below is applicable to the VECU 212, servers, personal computers, mobile phones, smart phones, tablet computers, embedded computing devices, and other currently available or yet-to-be-developed devices that may be used in accordance with embodiments of the present disclosure.

In its most basic configuration, the computing device 800 includes at least one processor 802 and a system memory 804 connected by a communication bus 806. Depending on the exact configuration and type of device, the system memory 804 may be volatile or nonvolatile memory, such as read-only memory ("ROM"), random access memory ("RAM"), EEPROM, flash memory, or other memory technology. Those of ordinary skill in the art and others will recognize that system memory 804 typically stores data or program modules that are immediately accessible to or currently being operated on by the processor 802. In this regard, the processor 802 may serve as a computational center of the computing device 800 by supporting the execution of instructions. According to one example, the system memory 804 may store one or more components of the AVL-TG system 100.

As further illustrated in FIG. 8, the computing device 800 may include a network interface 810 comprising one or more components for communicating with other devices over a network. Embodiments of the present disclosure may access basic services that utilize the network interface 810 to perform communications using common network protocols. The network interface 810 may also include a wireless network interface configured to communicate via one or more wireless communication protocols, such as WiFi, 2G, 3G, 4G, LTE, WiMAX, Bluetooth, or the like.

In the illustrative embodiment depicted in FIG. 8, the computing device 800 also includes a storage medium 808. However, services may be accessed using a computing device that does not include means for persisting data to a local storage medium. Therefore, the storage medium 808 depicted in FIG. 8 is optional. In any event, the storage medium 808 may be volatile or nonvolatile, removable or non-removable, implemented using any technology capable of storing information such as, but not limited to, a hard drive, solid state drive, CD-ROM, DVD, or other disk storage, magnetic tape, magnetic disk storage, or the like.

As used herein, the term "computer-readable medium" includes volatile and nonvolatile and removable and non-removable media implemented in any method or technology capable of storing information, such as computer-readable instructions, data structures, program modules, or other data. In this regard, the system memory 804 and storage medium 808 depicted in FIG. 8 are examples of computer-readable media.

For ease of illustration and because it is not important for an understanding of the claimed subject matter, FIG. 8 does not show some of the typical components of many computing devices. In this regard, the computing device 800 may include input devices, such as a keyboard, keypad, mouse, trackball, microphone, video camera, touchpad, touchscreen, electronic pen, stylus, or the like. Such input devices may be coupled to the computing device 800 by wired or wireless connections including RF, infrared, serial, parallel, Bluetooth, USB, or other suitable connection protocols using wireless or physical connections.

In any of the described examples, data can be captured by input devices and transmitted or stored for future processing. The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Input devices can be separate from and communicatively coupled to computing device 800 (e.g., a client device), or can be integral components of the computing device 800. In some embodiments, multiple input devices may be combined into a single, multifunction input device (e.g., a video camera with an integrated microphone). The computing device 800 may also include output devices such as a display, speakers, printer, etc. The output devices may include video output devices such as a display or touchscreen. The output devices also may include audio output devices such as external speakers or earphones. The output devices can be separate from and communicatively coupled to the computing device 800, or can be integral components of the computing device 800. Input functionality and output functionality may be integrated into the same input/output device (e.g., a touchscreen). Any suitable input device, output device, or combined input/output device either currently known or developed in the future may be used with described systems.

In general, functionality of computing devices described herein may be implemented in computing logic embodied in hardware or software instructions, which can be written in a programming language, such as C, C++, COBOL, JAVA™, PHP, Perl, HTML, CSS, JavaScript, VBScript, ASPX, Microsoft .NET™ languages such as C#, or the like. Computing logic may be compiled into executable programs or written in interpreted programming languages. Generally, functionality described herein can be implemented as logic modules that can be duplicated to provide greater processing capability, merged with other modules, or divided into sub-modules. The computing logic can be stored in any type of computer-readable medium (e.g., a non-transitory medium such as a memory or storage medium) or computer storage device and be stored on and executed by one or more general-purpose or special-purpose processors, thus creating a special-purpose computing device configured to provide functionality described herein.

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

We claim:

1. A system for providing automated launch torque, the system comprising:
    at least one processor;
    a memory storage device, operatively connected to the at least one processor and including instructions that, when executed by the at least one processor, are configured to cause the system to:
        receive an indication to generate a launch torque request to move a vehicle operating in adaptive cruise control mode from an initial vehicle speed below a minimum threshold speed to the minimum threshold speed;
        receive a first signal indicating the vehicle's weight and a second signal indicating the vehicle's grade;
        determine a pedal saturation value based on the vehicle's weight and the vehicle's grade;
        receive a third signal indicating an engine speed;
        determine a pedal ramp rate for a dynamic application of the pedal saturation value based at least in part on the engine speed, the pedal ramp rate being a dynamic pedal ramp rate configured to mimic a torque request initiated by an operator;
        determine launch torque demand based on the pedal saturation value and the pedal ramp rate;
        transmit to one or more powertrain components one or more communications regarding the launch torque demand according to the pedal ramp rate; and
        in response to transmitting the one or more communications, automatically adjusting a speed of the vehicle to be launched to the minimum threshold speed.

2. The system of claim 1, wherein the instructions are further configured to cause the system to determine the pedal saturation value based on a pedal saturation table including pedal saturation values corresponding to a plurality of combinations of vehicle weights and vehicle grades.

3. The system of claim 1, wherein the instructions are further configured to cause the system to determine the pedal ramp rate based on a pedal ramp rate table including pedal saturation rate values corresponding to a plurality of engine speeds.

4. The system of claim 2, wherein the pedal saturation values and pedal saturation rate values are determined based on a machine learning algorithm.

5. The system of claim 3, wherein the instructions are further configured to cause the system to:
receive a fourth signal indicating a launch aggression setting; and
adjust the pedal saturation rate values based on the received launch aggression setting.

6. The system of claim 1, wherein, in determining the launch torque demand, the instructions are further configured to cause the system to:
input the pedal saturation value and the pedal ramp rate into a pedal map;
receive a launch torque demand in a percent format; and
translate the launch torque demand from the percent format into a value format understood by the one or more powertrain components.

7. The system of claim 1, wherein the instructions are further configured to cause the system to:
receive a fifth signal indicating an adaptive cruise control torque limit; and
apply the torque limit to the launch torque demand.

8. The system of claim 1, wherein the instructions are further configured to cause the system to:
receive an indication the vehicle's speed is at or above the minimum threshold speed;
transition from a launch-on state to a regular cruise control operating state;
continue to transmit one or more communications regarding the launch torque demand for a predetermined number of cycles;
determine torque demand to speed the vehicle up to a target cruise control speed and to maintain the target cruise control speed; and
transmit one or more communications regarding the torque demand to the one or more powertrain components to perform one or more powertrain actions to speed the vehicle up from the minimum threshold speed to the target cruise control speed and to maintain the target cruise control speed based on the communications.

9. The system of claim 1, wherein the minimum threshold speed is a cruise control handover speed corresponding with a lower bound of a cruise control governor.

10. A method for providing automated launch torque, comprising:
receiving an indication to generate a launch torque request to move a vehicle operating in adaptive cruise control mode from an initial vehicle speed to a cruise control handover speed;
receiving a first signal indicating the vehicle's weight and a second signal indicating the vehicle's grade;
determining a pedal saturation value based on the vehicle's weight and the vehicle's grade;
receiving a third signal indicating an engine speed;
determining a pedal ramp rate for a dynamic application of the pedal saturation value based at least in part on the engine speed, the pedal ramp rate being a dynamic pedal ramp rate configured to mimic a torque request initiated by an operator;
determining launch torque demand based on the pedal saturation value and the pedal ramp rate; and
transmitting to one or more powertrain components one or more communications regarding the launch torque demand according to the pedal ramp rate; and
in response to transmitting the one or more communications, automatically adjusting a speed of the vehicle to be launched to the cruise control handover speed.

11. The method of claim 10, wherein determining the pedal saturation value comprises using a pedal saturation table including pedal saturation values corresponding to a plurality of combinations of vehicle weights and vehicle grades to determine the pedal saturation value.

12. The method of claim 10, wherein determining the pedal ramp rate comprises using a pedal ramp rate table including pedal saturation rate values corresponding to a plurality of engine speeds.

13. The method of claim 12, further comprising:
receiving a fourth signal indicating a launch aggression setting; and
adjusting the pedal saturation rate values based on the received launch aggression setting.

14. The method of claim 10, wherein determining the launch torque demand comprises:
inputting the pedal saturation value and the pedal ramp rate into a pedal map;
receiving a launch torque demand in a percent format; and
translating the launch torque demand from the percent format into a value format understood by the one or more powertrain components.

15. The method of claim 10, further comprising:
receiving a fifth signal indicating an adaptive cruise control torque limit; and
applying the torque limit to the launch torque demand.

16. The method of claim 10, further comprising:
receiving an indication the vehicle's speed is at or above the cruise control handover speed;
transitioning from a launch-on state to a regular cruise control operating state;
continuing to transmit one or more communications regarding the launch torque demand for a predetermined number of cycles;
determining torque demand to speed the vehicle up to a target cruise control speed and to maintain the target cruise control speed; and
transmitting one or more communications regarding the torque demand to the one or more powertrain components to perform one or more powertrain actions to speed the vehicle up from the minimum threshold speed to the target cruise control speed and to maintain the target cruise control speed based on the communications.

17. A vehicle comprising a powertrain, at least one axle, operatively connected to the powertrain, at least two wheels, operatively connected to the at least one axle, and a computing system, operatively connected to the powertrain and comprising at least one processor and memory containing instructions that, when executed by the at least one processor, cause the at least one processor to:
receive an indication to generate a launch torque request to move a vehicle operating in adaptive cruise control mode from an initial vehicle speed to a cruise control handover speed;

receive a first signal indicating the vehicle's weight and a second signal indicating the vehicle's grade;

determine a pedal saturation value based on the vehicle's weight and the vehicle's grade;

receive a third signal indicating an engine speed;

determine a pedal ramp rate for a dynamic application of the pedal saturation value based at least in part on the engine speed, the pedal ramp rate being a dynamic pedal ramp rate configured to mimic a torque request initiated by an operator;

determine launch torque demand based on the pedal saturation value and the pedal ramp rate; and transmit to one or more powertrain components one or more communications regarding the launch torque demand according to the pedal ramp rate to cause the vehicle to be launched to the cruise control handover speed.

18. The vehicle of claim 17, wherein the instructions further cause the at least one processor to:

receive a fourth signal indicating a launch aggression setting; and adjust the pedal saturation rate values based on the received launch aggression setting.

19. The vehicle of claim 17, wherein the instructions further cause the at least one processor to:

receive a fifth signal indicating an adaptive cruise control torque limit; and apply the torque limit to the launch torque demand.

20. The vehicle of claim 17, wherein the instructions further cause the at least one processor to:

receive an indication the vehicle's speed is at or above the cruise control handover speed;

transition from a launch-on state to a regular cruise control operating state;

continue to transmit communications regarding the launch torque demand for a predetermined number of cycles;

determine torque demand to speed the vehicle up to a target cruise control speed and to maintain the target cruise control speed; and transmit one or more communications regarding the torque demand to the one or more powertrain components to perform one or more powertrain actions to speed the vehicle up from the minimum threshold speed to the target cruise control speed and to maintain the target cruise control speed based on the communications.

* * * * *